(12) United States Patent  
Chang et al.

(10) Patent No.: US 9,201,463 B2
(45) Date of Patent: Dec. 1, 2015

(54) PORTABLE ELECTRONIC DEVICE CAPABLE OF LIFTING A HOST MODULE AS A DISPLAY MODULE ROTATES RELATIVE TO THE HOST MODULE

(71) Applicant: Wistron Corporation, New Taipei (TW)

(72) Inventors: Wen-Tsung Chang, New Taipei (TW); Ai-Chun Sun, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 173 days.

(21) Appl. No.: 14/071,611

(22) Filed: Nov. 4, 2013

(65) Prior Publication Data

US 2014/0218846 A1  Aug. 7, 2014

(30) Foreign Application Priority Data

Feb. 5, 2013  (TW) .............................. 102104364 A

(51) Int. Cl.
*G06F 1/16* (2006.01)
(52) U.S. Cl.
CPC ............ *G06F 1/1675* (2013.01); *G06F 1/1616* (2013.01); *G06F 1/1681* (2013.01)
(58) Field of Classification Search
CPC ................................. G06F 1/1616; G06F 1/16
USPC .................................................... 361/679.55
See application file for complete search history.

(56) References Cited

U.S. PATENT DOCUMENTS

| 2013/0229753 A1 | 9/2013 | Hsiu |
| 2014/0312628 A1* | 10/2014 | Yuan .............................. 292/121 |
| 2014/0328019 A1* | 11/2014 | Liang et al. .............. 361/679.55 |
| 2014/0331452 A1* | 11/2014 | Zhang ............................. 16/337 |
| 2015/0009614 A1* | 1/2015 | Tsai ......................... 361/679.27 |

FOREIGN PATENT DOCUMENTS

| CN | 202563380 U | 11/2012 |
| TW | M313401 | 6/2007 |

OTHER PUBLICATIONS

Office action mailed on Nov. 5, 2014 for the Taiwan application No. 102104364, filing date: Feb. 5, 2013, p. 1 line 1~14, p. 2~3 and p. 4 line 1~6.

* cited by examiner

*Primary Examiner* — Forrest M Phillips
(74) *Attorney, Agent, or Firm* — Winston Hsu; Scott Margo

(57) ABSTRACT

A portable electronic device includes a host module, a display module pivoted to the host module, a pivoting component and a lifting mechanism. The pivoting component is driven by the display module to rotate simultaneously. The lifting mechanism includes a base, a linking component connected to the base, a sliding component and a pushing component. A guiding slot is formed on the sliding component, and the guiding slot sheathes the linking component. The pushing component is installed on the pivoting component for pushing the sliding component to move in a first direction after the display module pivots relative to the host module to a predetermined angle, so that the guiding slot guides the linking component to move in a second direction different from the first direction, so as to drive the base to protrude outside a bottom side of the host module to lift the host module up.

15 Claims, 6 Drawing Sheets

PORTABLE ELECTRONIC DEVICE CAPABLE OF LIFTING A HOST MODULE AS A DISPLAY MODULE ROTATES RELATIVE TO THE HOST MODULE

BACKGROUND OF THE INVENTION

1. Field of the Invention

The present invention relates to a portable electronic device, and more specifically, to a portable electronic device capable of lifting a host module as a display module pivots relative to the host module.

2. Description of the Prior Art

A notebook computer with a slim design becomes popular in the market, such as an ultrabook computer. However, because a host module of the slim type notebook computer has a small thickness, a pivoting end of a display module of the notebook computer may hit a supporting plane, such as a desk, as the display module pivots relative to the host module to a predetermined angle, so that the notebook computer cannot disposed on the supporting plane stably. Many kinds of conventional mechanisms are designed to solve this problem, such as disposing a pad on a bottom of the host module so that a rear side of the host module is higher than a front side of the host module, modifying a shape of a bottom of the display module, limiting a maximum angle between the display module and the host module, or designing an end edge of the display module as a pad for supporting the display module. However, it increases a thickness of the host module and affects the appearance of the host module by disposing the pad, and the pad is not suitable for different notebook computers. Modifying the shape of the display module affects the appearance of the notebook computer, limiting the maximum angle between the display module and the host module affects the user experience, and designing the end edge of the display module as the pad for supporting the display module not only results in a risk of breaking the host module as the host module is pressed, but also damage the end edge of the display module. Therefore, it is an important issue to design a portable electronic device which does not need to modify the thickness of the host module and the appearance of the display module and is not interfered by a supporting surface as the display module pivots relative to the host module on the supporting surface.

SUMMARY OF THE INVENTION

The present invention is to provide a portable electronic device capable of lifting a host module as a display module pivots relative to the host module, to solve above problems.

According to the disclosure, the portable electronic device includes a host module, a display module, a pivoting component and a lifting mechanism. The display module is pivoted to the host module. The pivoting component is for pivoting the display module relative to the host module, and the pivoting component is driven by the display module to rotate simultaneously as the display module pivots relative to the host module in a first rotating direction. The lifting mechanism is for lifting the host module as the display module pivots relative to the host module to a predetermined angle formed between the display module and the host module. The lifting mechanism includes a base, a linking component, a sliding component and a pushing component. The base passes through a bottom side of the host module. The linking component is connected to the base. The sliding component is installed inside the host module, a guiding slot is formed on the sliding component, and the guiding slot sheathes the linking component for guiding movement of the linking component. The pushing component is installed on the pivoting component for pushing the sliding component to move in a first direction after the display module pivots relative to the host module to the predetermined angle, so that the guiding slot guides the linking component to move in a second direction different from the first direction, so as to drive the base to protrude outside the bottom side of the host module to lift the host module up.

According to the disclosure, the pivoting component is a cylinder, and the pushing component is installed on a circumference of the pivoting component.

According to the disclosure, a groove slot is further formed on the sliding component, the pushing component is engaged with the groove slot after the display module pivots relative to the host module in the first rotating direction to the predetermined angle, and the pushing component contacts against the groove slot as the display module pivots relative to the host module in a direction opposite to the first rotating direction, so as to drive the sliding component to move in a direction opposite to the first direction, so that the guiding slot guides the linking component to move in a direction opposite to the second direction, for driving the base to retract into the bottom side of the host module to settle the host module.

According to the disclosure, the base and the linking component are integrally formed.

According to the disclosure, the base is made of rubber material, and the linking component is made of plastic material.

According to the disclosure, the base and the linking component are formed through double injection molding.

According to the disclosure, the predetermined angle is substantially 90 degrees.

According to the disclosure, the linking component is located on an end of the guiding slot as the display module pivots relative to the host module at an angle of 135 degrees substantially.

According to the disclosure, two containing slots are formed on two ends of the guiding slot, respectively, and a trend of the containing slot is parallel to the first direction substantially.

The portable electronic device of the present invention disposes the pushing component on the pivoting component, so that the pushing component pushes the sliding component to move in the first direction as the display module pivots relative to the host module to the predetermined angle. As a result, the guiding slot guides the linking component to move in the second direction which is different from the first direction, so as to drive the base to protrude outside the bottom side of the host module to lift the host module up. Therefore, it can solve a problem that a bottom of the display module hits a supporting plane for supporting the portable electronic device due to a small thickness of the host module as the display module pivots relative to the host module to the predetermined angle. In addition, the present invention does not modify the thickness of the host module and the appearance of the display module and does not need to limit the maximum angle between the display module and the host module.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
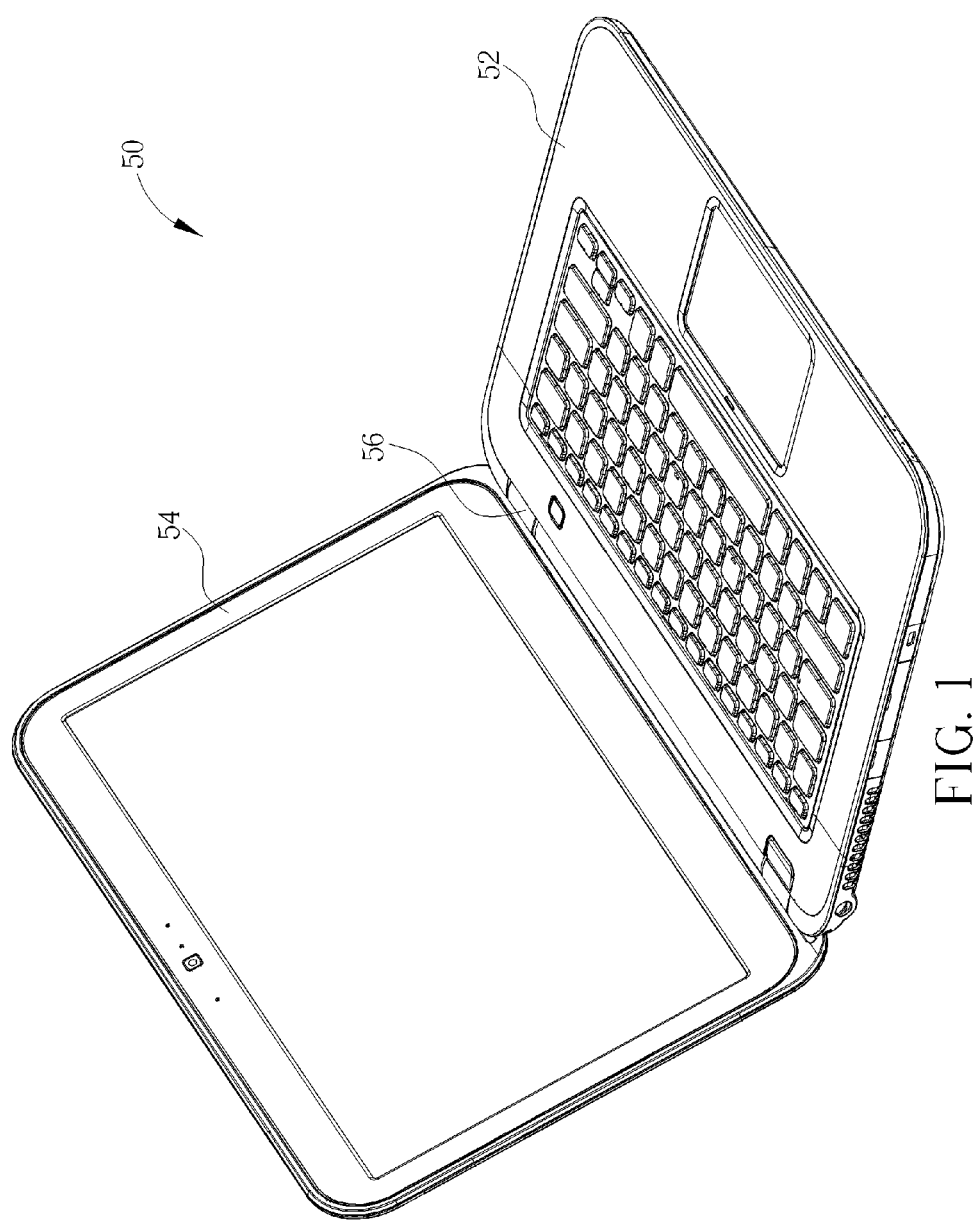
FIG. 1 is a diagram of a portable electronic device according to an embodiment of the present invention.
Figure 2:
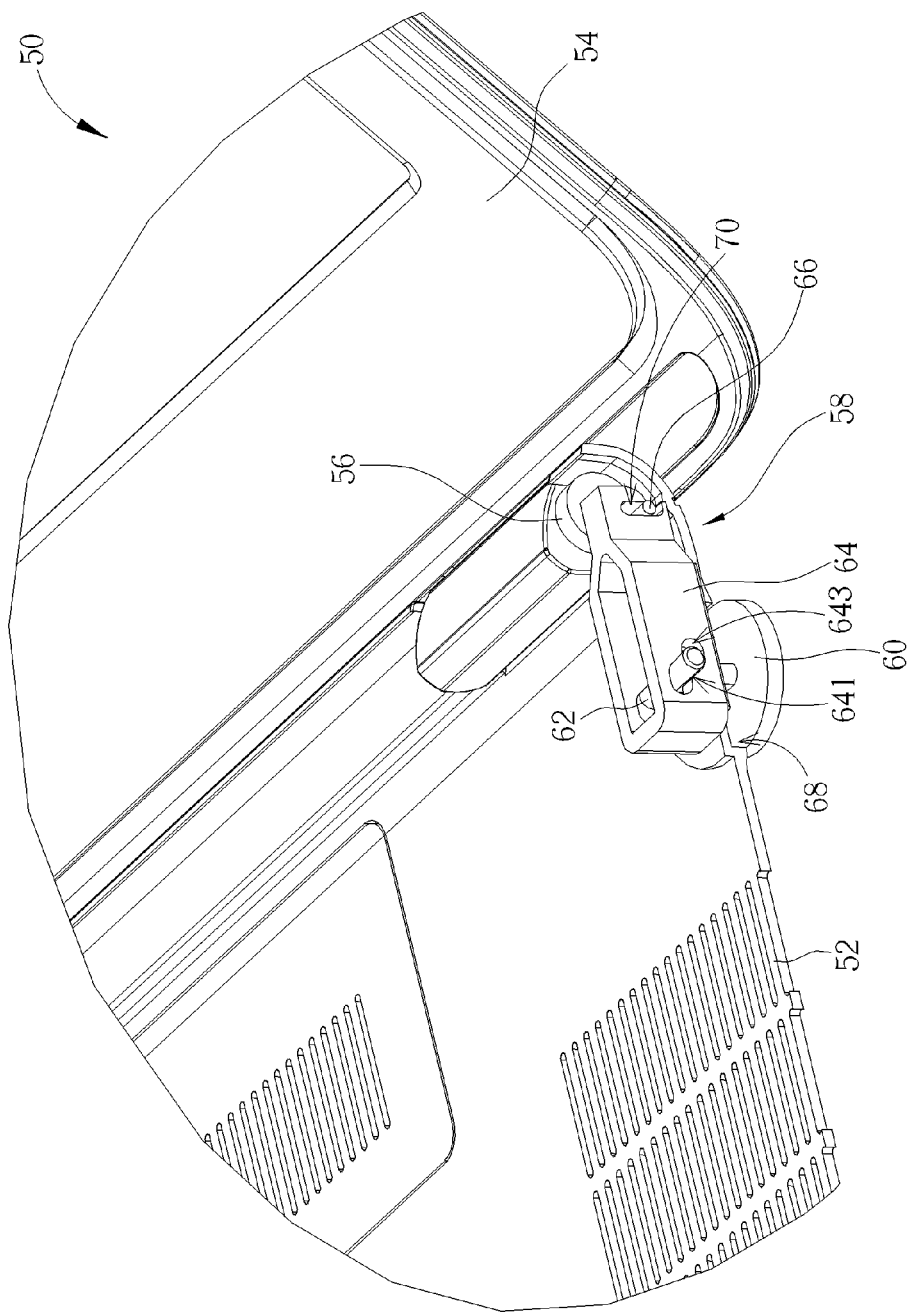
FIG. 2 is a diagram of a lifting mechanism according to the embodiment of the present invention.
Figure 3:
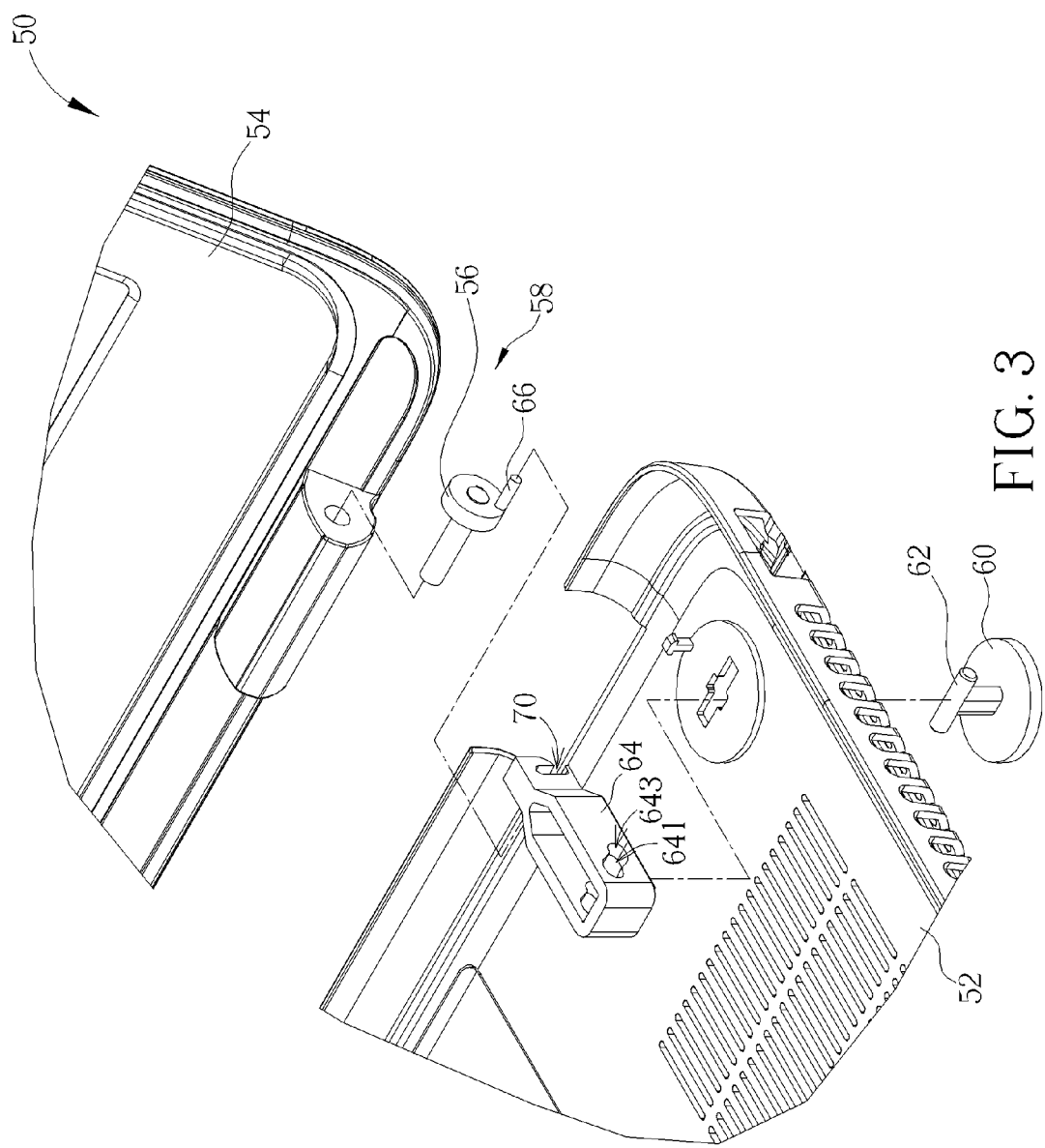
FIG. 3 is an exploded diagram of the lifting mechanism according to the embodiment of the present invention.
Figure 4:
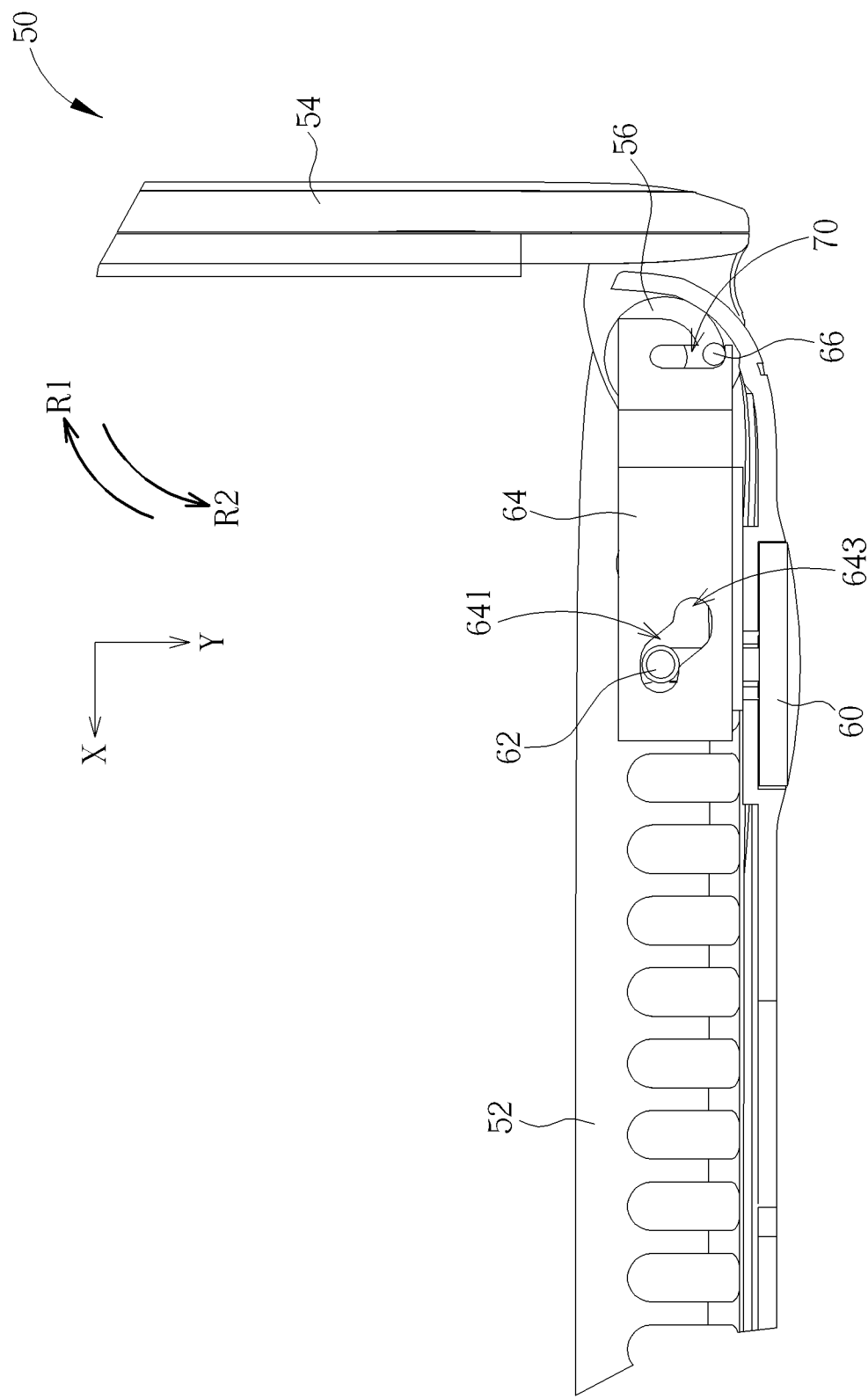
FIG. 4 is a side view of the portable electronic device according to the embodiment of the present invention.

Please refer to FIG. 1. FIG. 1 is a diagram of a portable electronic device 50 according to an embodiment of the present invention. The portable electronic device 50 can be a notebook computer, and the portable electronic device 50 includes a host module 52, a display module 54 and a pivoting component 56. The host module 52 includes various electronic components, such as a CPU, a hard drive, a fan, a memory, an expansion card, and so on, so as to control the portable electronic device 50. The display module 54 is pivoted to the host module 52 and can display various information of the portable electronic device 50. The pivoting component 56 is for pivoting the display module 54 relative to the host module 52, so that the display module 54 can pivot relative to the host module 52. Please refer to FIG. 1 to FIG. 4. FIG. 2 is a diagram of a lifting mechanism 58 according to the embodiment of the present invention. FIG. 3 is an exploded diagram of the lifting mechanism 58 according to the embodiment of the present invention. FIG. 4 is a side view of the portable electronic device 50 according to the embodiment of the present invention. The lifting mechanism 58 is for lifting the host module 52 as the display module 54 pivots relative to the host module 52 to a predetermined angle formed between the display module and the host module. The lifting mechanism 58 includes a base 60, a linking component 62, a sliding component 64 and a pushing component 66. The base 60 passes through a bottom side of the host module 52. The linking component 62 is connected to the base 60. The sliding component 64 is slidably installed inside the host module 52, and a guiding slot 641 is formed on the sliding component 64. The guiding slot 641 sheathes the linking component 62 for guiding movement of the linking component 62. The pushing component 66 is installed on the pivoting component 56, so as to move with the pivoting component 56 simultaneously. The pushing component 66 is for pushing the sliding component 64 to move in a first direction (+X direction) after the display module 54 pivots relative to the host module 52 to the predetermined angle, so that the guiding slot 641 guides the linking component 62 to move in a second direction (+Y direction) different from the first direction (+X direction), so as to drive the base 60 to protrude outside the bottom side of the host module 52 to lift the host module 52 up.

Figure 5:
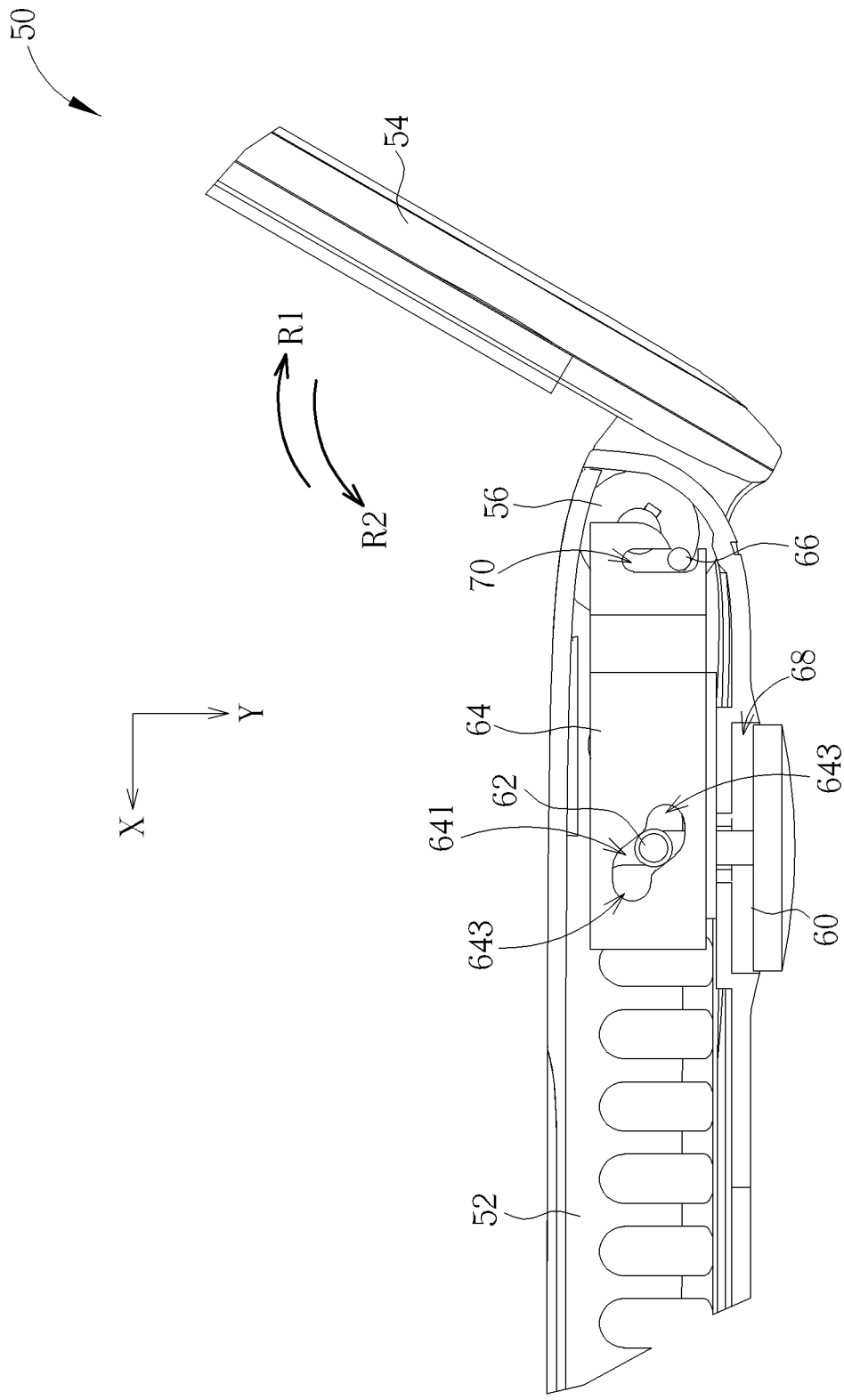
FIG. 5 is a side view illustrating that a display module pivots relative to a host module over a predetermined angle according to the embodiment of the present invention.
Figure 6:
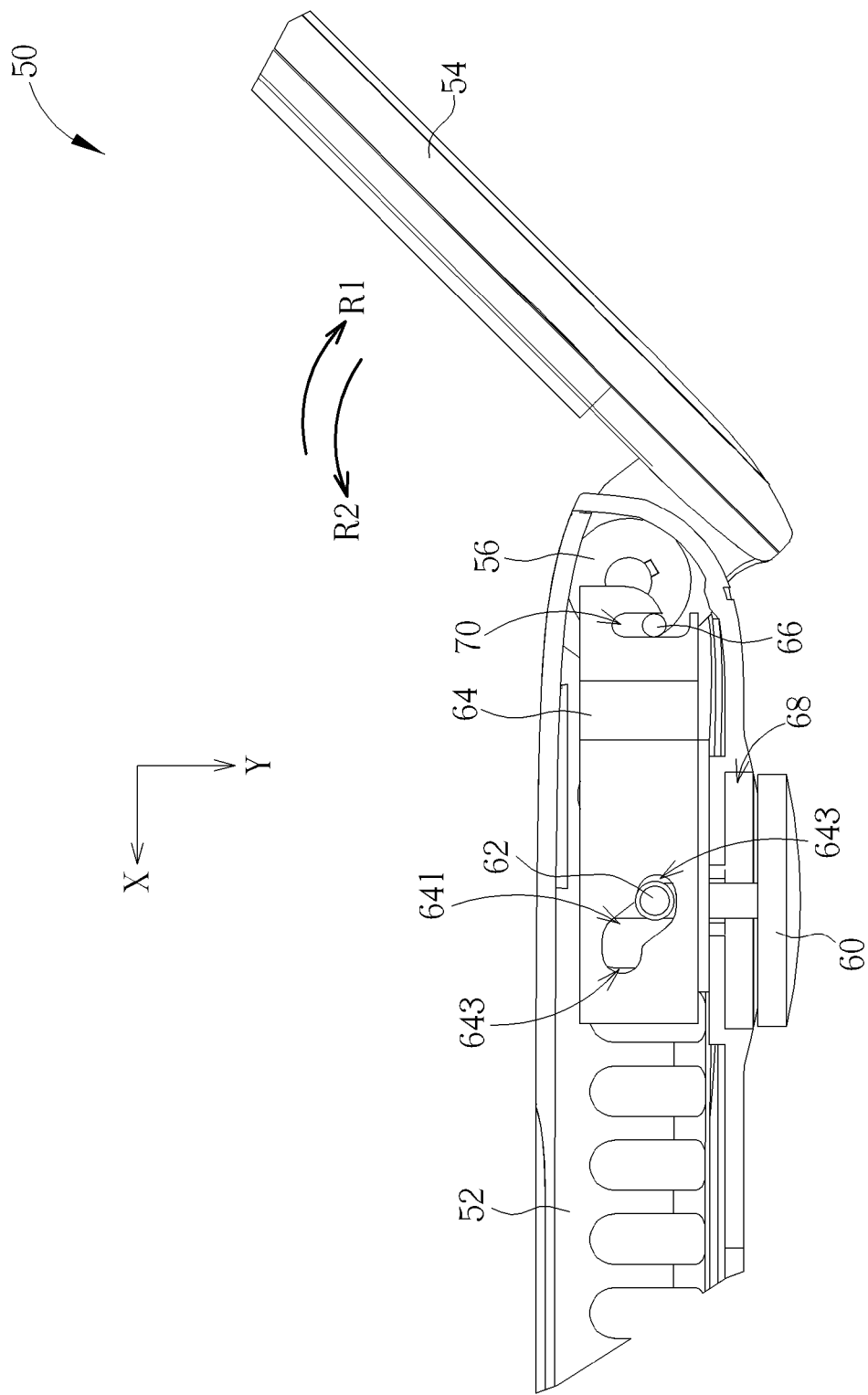
FIG. 6 is a side view illustrating that the display module pivots relative to the host module to a maximum angle according to the embodiment of the present invention.

Please refer to FIG. 4 to FIG. 6. FIG. 5 is a side view illustrating that the display module 54 pivots relative to the host module 52 over the predetermined angle according to the embodiment of the present invention. FIG. 6 is a side view illustrating that the display module 54 pivots relative to the host module 52 to a maximum angle according to the embodiment of the present invention. As shown in FIG. 4 to FIG. 6, the pivoting component 56 can be driven by the display module 54 to rotate simultaneously as the display module 54 pivots relative to the host module 52 in a first rotating direction R1. In this embodiment, the pivoting component 56 can be a cylinder, but not limited to it. In addition, the pushing component 66 is installed on a circumference of the pivoting component 56, so that the pushing component 66 rotates with the pivoting component 56 simultaneously as the display module 54 pivots relative to the host module 52 in the first rotating direction R1. As a result, as shown in FIG. 4, the pushing component 66 contacts against a side of the sliding component 64 as the display module 54 pivots relative to the host module 52 to the predetermined angle, so that the pushing component 66 starts to drive the sliding component 64 to move in the first direction (+X direction). The predetermined angle can be substantially 90 degrees. That is, an included angle between the display module 54 and the host module 52 is a right angle, but the predetermined angle is not limited to it, and it depends on practical design demands. Furthermore, as shown in FIG. 5, a bottom slot 68 is formed on the bottom side of the host module 52 for containing the base 60. In this embodiment, the base 60 and the linking component 62 can be integrally formed. For example, the base 60 can be made of rubber material, such as a rubber pad. The linking component 62 can be made of plastic material. The base 60 and the linking component 62 can be made of different materials, and the base 60 and the linking component 62 can be formed through double injection molding, so as to meet design demands.

A procedure of the lifting mechanism 58 lifting the host module 52 is described as follows. As a user is desired to open the portable electronic device 50, the user can push the display module 54, so that the display module 54 pivots relative to the host module 52 in the first rotating direction R1. As the display module 54 pivots relative to the host module 52 to the predetermined angle, as shown in FIG. 4, the pushing component 66 contacts against a side of the sliding component 64 and starts to drive the sliding component 64 to move in the first direction (+X direction). As the user keeps pushing the display module 54, the display module 54 continues to pivot relative to the host module 52 in the first rotating direction R1. At this time, as shown in FIG. 5, the pushing component 66 drives the sliding component 64 to move in the first direction (+X direction), and the guiding slot 641 guides the linking component 62 to move in the second direction (+Y direction) different from the first direction (+X direction). Because the linking component 62 is fixed on the base 60, the linking component 62 drives the base to protrude outside the bottom side of the host module 52 to lift the host module 52 up. It is noticed that a groove slot 70 is further formed on the sliding component 64, and the pushing component 66 is engaged with the groove slot 70 as the display module 54 pivots relative to the host module 52 in the first rotating direction R1 to the predetermined angle.

Finally, as shown in FIG. 6, as the display module 54 pivots relative to the host module 52 to the maximum angle, the linking component 62 is located on an end of the guiding slot 641, and the base 60 has lifted the host module 52 up. In this embodiment, the maximum angle can be substantially 135 degrees, but not limited to it, and the maximum angle can depend on practical design demands. In addition, two containing slots 643 are formed on two ends of the guiding slot 641, respectively, and a trend of the containing slot 643 is parallel to the first direction (+X direction) substantially. The containing slot 643 is for preventing the guiding slot 641 from guiding the linking component 62 to drive the base 60 to move in the second direction (+Y direction) as the display module 54 pivots relative to the host module 52 over the maximum angle unexpectedly, so that the host module 52 is shocked. That is, as the display module 54 pivots relative to the host module 52 to the maximum angle, even though the user keeps pushing the display module 54, the base 60 does not move in the second direction (+Y direction) to lift the host module 52 anymore. The containing slots 643, which are designed to be disposed on the two ends of the guiding slot 641, can eliminate a tolerance problem resulted from the linking component 62 and the sliding component 64 driven by the pushing component 66 to move relative to an inner surface of the guiding slot 641.

As the user is desired to fold up the portable electronic device 50, as shown in FIG. 6, the user can push the display module 54, so that the display module 54 pivots relative to the host module 52 in a second rotating direction R2 opposite to the first rotating direction R1. At this time, because the pushing component 66 contacts against the groove slot 70, the pushing component 66 can drive the sliding component 64 to move in a direction opposite to the first direction (+X direction) again, so that the guiding slot 641 guides the linking component 62 to move in a direction opposite to the second direction (+Y direction). As shown in FIG. 5, as the display module 54 continues to pivot relative to the host module 52, the pushing component 66 still contacts against the groove slot 70, and the guiding slot 641 continues to guide the linking component 62 to move in the direction opposite to the second direction (+Y direction), so that the base continues to move in the direction opposite to the second direction (+Y direction). Finally, as shown in FIG. 4, the base 60 is driven to retract into the bottom slot 68 of the bottom side of the host module 52, so as to contain the base 60 to settle the host module. At this time, the pushing component 66 pivots to a position where the pushing component 66 is separated from the groove slot 70.

After that, the pushing component 66 does not push the sliding component 64 in the direction opposite to the first direction (+X direction) to drive the base 60 as the display module 54 continues to pivot relative to the host module 52 in the second rotating direction. A returning mechanism of the base 60 is not limited to a combination of the groove slot 70 and the pushing component 66 in this embodiment. For example, the groove slot 70 can be omitted, and the base 60 can be retracted into the bottom slot 68 manually. It also can retract the base 60 by other returning mechanism, such as returning the sliding component 64 to an initial position by a resilient force of a resilient component, and the returning mechanism depends on practical design demands.

In contrast to the prior art, the portable electronic device of the present invention disposes the pushing component on the pivoting component, so that the pushing component pushes the sliding component to move in the first direction as the display module pivots relative to the host module to the predetermined angle. As a result, the guiding slot guides the linking component to move in the second direction which is different from the first direction, so as to drive the base to protrude outside the bottom side of the host module to lift the host module up. Therefore, it can solve a problem that a bottom of the display module hits a supporting plane for supporting the portable electronic device due to a small thickness of the host module as the display module pivots relative to the host module to the predetermined angle. In addition, the present invention does not modify the thickness of the host module and the appearance of the display module and does not need to limit the maximum angle between the display module and the host module.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A portable electronic device, comprising:
   a host module;
   a display module pivoted to the host module;
   a pivoting component for pivoting the display module relative to the host module, the pivoting component being driven by the display module to rotate simultaneously as the display module pivots relative to the host module in a first rotating direction; and
   a lifting mechanism for lifting the host module as the display module pivots relative to the host module to a predetermined angle formed between the display module and the host module, the lifting mechanism comprising:
      a base passing through a bottom side of the host module;
      a linking component connected to the base;
      a sliding component installed inside the host module, a guiding slot and a groove slot being formed on the sliding component, and the guiding slot sheathing the linking component for guiding movement of the linking component; and
      a pushing component installed on the pivoting component for pushing the sliding component to move in a first direction after the display module pivots relative to the host module to the predetermined angle, so that the guiding slot guides the linking component to move in a second direction different from the first direction, so as to drive the base to protrude outside the bottom side of the host module to lift the host module up, the pushing component being engaged with the groove slot after the display module pivots relative to the host module in the first rotating direction to the predetermined angle, and the pushing component contacting against the groove slot as the display module pivots relative to the host module in a direction opposite to the first rotating direction, so as to drive the sliding component to move in a direction opposite to the first direction, so that the guiding slot guides the linking component to move in a direction opposite to the second direction, for driving the base to retract into the bottom side of the host module to settle the host module.

2. The portable electronic device of claim 1, wherein the pivoting component is a cylinder, and the pushing component is installed on a circumference of the pivoting component.

3. The portable electronic device of claim 1, wherein the base and the linking component are integrally formed.

4. The portable electronic device of claim 1, wherein the base is made of rubber material, and the linking component is made of plastic material.

5. The portable electronic device of claim 4, wherein the base and the linking component are formed through double injection molding.

6. The portable electronic device of claim 1, wherein the predetermined angle is substantially 90 degrees.

7. The portable electronic device of claim 1, wherein the linking component is located on an end of the guiding slot as the display module pivots relative to the host module at an angle of 135 degrees substantially.

8. The portable electronic device of claim 1, wherein two containing slots are formed on two ends of the guiding slot, respectively, and a trend of the containing slot is parallel to the first direction substantially.

9. A portable electronic device, comprising:
   a host module;
   a display module pivoted to the host module;

a pivoting component for pivoting the display module relative to the host module, the pivoting component being driven by the display module to rotate simultaneously as the display module pivots relative to the host module in a first rotating direction; and a lifting mechanism for lifting the host module as the display module pivots relative to the host module to a predetermined angle formed between the display module and the host module, the lifting mechanism comprising:

a base passing through a bottom side of the host module;

a linking component connected to the base;

a sliding component installed inside the host module, a guiding slot being formed on the sliding component, and the guiding slot sheathing the linking component for guiding movement of the linking component, two containing slots being formed on two ends of the guiding slot, respectively, and a trend of the containing slot being parallel to a first direction substantially; and a pushing component installed on the pivoting component for pushing the sliding component to move in the first direction after the display module pivots relative to the host module to the predetermined angle, so that the guiding slot guides the linking component to move in a second direction different from the first direction, so as to drive the base to protrude outside the bottom side of the host module to lift the host module up.

10. The portable electronic device of claim 9, wherein the pivoting component is a cylinder, and the pushing component is installed on a circumference of the pivoting component.

11. The portable electronic device of claim 9, wherein the base and the linking component are integrally formed.

12. The portable electronic device of claim 9, wherein the base is made of rubber material, and the linking component is made of plastic material.

13. The portable electronic device of claim 12, wherein the base and the linking component are formed through double injection molding.

14. The portable electronic device of claim 9, wherein the predetermined angle is substantially 90 degrees.

15. The portable electronic device of claim 9, wherein the linking component is located on an end of the guiding slot as the display module pivots relative to the host module at an angle of 135 degrees substantially.

* * * * *